(12) United States Patent
Decker et al.

(10) Patent No.: US 6,709,479 B1
(45) Date of Patent: Mar. 23, 2004

(54) PRECLEANER FOR VACUUM SYSTEMS

(75) Inventors: William K. Decker, Cambridge, WI (US); Charles H. Solberg, Tower Lakes, IL (US)

(73) Assignees: American Farm Implement & Specialty, Inc., Janesville, WI (US); Solberg Manufacturing, Inc., Itasca, IL (US)

( * ) Notice: Subject to any disclaimer, the term of this patent is extended or adjusted under 35 U.S.C. 154(b) by 13 days.

(21) Appl. No.: 10/280,643

(22) Filed: Oct. 25, 2002

(51) Int. Cl.[7] ............................................... B01D 45/12

(52) U.S. Cl. ............................. 55/429; 55/430; 55/447; 55/449

(58) Field of Search .......................... 55/437, 438, 447, 55/429, 430, 449, DIG. 17; 184/55.2

(56) References Cited

U.S. PATENT DOCUMENTS

| | | |
|---|---|---|
| 1,641,746 A | 9/1927 | Donaldson |
| 1,870,216 A | 8/1932 | Baldwin |
| 2,193,479 A | 3/1940 | Donaldson |
| 2,304,778 A | 12/1942 | Cresswell |
| 2,417,130 A | 3/1947 | Russell |
| 2,692,655 A * | 10/1954 | Peeps ........................... 55/457 |
| 2,894,600 A * | 7/1959 | Veres ........................... 55/335 |
| 2,973,830 A | 3/1961 | Gruner |
| 3,378,993 A * | 4/1968 | Veres et al. .................... 96/409 |
| 3,552,102 A | 1/1971 | Araki |
| 3,670,480 A | 6/1972 | Petersen |
| 3,740,932 A | 6/1973 | Borsheim |
| 3,791,112 A | 2/1974 | Lidstone |
| 3,877,907 A | 4/1975 | Elliff |
| 3,973,937 A | 8/1976 | Petersen |
| 4,013,137 A | 3/1977 | Petersen |
| 4,135,897 A | 1/1979 | Gondek |
| 4,138,761 A | 2/1979 | Nauta |
| 4,197,102 A | 4/1980 | Decker |
| 4,201,557 A | 5/1980 | Petersen |
| 4,248,613 A | 2/1981 | Linhart |
| 4,268,281 A | 5/1981 | Erickson |
| 4,373,940 A | 2/1983 | Petersen |

(List continued on next page.)

FOREIGN PATENT DOCUMENTS

| | | |
|---|---|---|
| FR | 683986 | 6/1929 |
| IT | 483058 | 7/1953 |
| WO | WO 01/70374 | 9/2001 |

OTHER PUBLICATIONS

Advertising for Best–Ex Centri Air Pre–Cleaners, by Best–Ex, Inc. before 1990.

Photocopy of cutaway view of the Centri Air Pre–Cleaner sold by Best–Ex, Inc.

Kate Miller, "Sy–Klone Makes the Best Better," OEM Off Highway, Jan. 1996, pp. 34, 36.

*Primary Examiner*—Robert A. Hopkins
(74) *Attorney, Agent, or Firm*—Foley & Lardner

(57) ABSTRACT

An air precleaner for mechanically removing particulate contaminants from an enclosed environment includes a peripheral air intake manifold that is in communication with the inlet port of a mechanical separation unit, and a central exhaust port that is in communication with the air output port of the mechanical separation unit. The precleaner can be inserted into or onto a vacuum system from which airborne particulate matter is to be removed. The precleaner includes a container which may be a two part container formed of a fitting assembly and a canister for the collection of particulates. The canister itself may be divided into a top and a bottom, compartment by a flange extending outwardly around the outer edge of the mechanical separation unit. Particulate matter collects in the bottom compartment of the canister, which can be periodically removed from the rest of the precleaner to dispose of the accumulated particulates.

14 Claims, 5 Drawing Sheets

U.S. PATENT DOCUMENTS

| | | |
|---|---|---|
| 4,382,804 A | 5/1983 | Mellor |
| 4,459,141 A | 7/1984 | Burrington et al. |
| 4,547,207 A | 10/1985 | Petersen |
| 5,022,903 A | 6/1991 | Decker |
| 5,059,222 A | 10/1991 | Smith |
| 5,163,786 A | 11/1992 | Christianson |
| 5,449,391 A | 9/1995 | Decker |
| 5,505,756 A | 4/1996 | Decker |
| 5,656,050 A | 8/1997 | Moredock |
| 5,766,315 A | 6/1998 | Moredock |
| 5,837,020 A | 11/1998 | Cartellone |
| D422,069 S | 3/2000 | Decker |
| 6,251,152 B1 | 6/2001 | Thiele |
| 6,264,712 B1 | 7/2001 | Decker |
| 6,348,077 B1 | 2/2002 | Solberg, Jr. et al. |
| 6,361,574 B1 | 3/2002 | Decker |

\* cited by examiner

PRECLEANER FOR VACUUM SYSTEMS

FIELD OF THE INVENTION

This invention relates generally to devices for separating particulates, such as dirt and dust, from air that is recirculated in a vacuum or pneumatic conveying system.

BACKGROUND OF THE INVENTION

Air precleaners are devices typically used in the removal of dust, dirt, sand, and other airborne particulates prior to the flow of air through a filter. The efficiency of the precleaner is determined by the percentage of particulates that are removed from the intake air by the precleaner. The more efficient the precleaner, the lesser the amount of particulates that must be removed by the air filter.

Many enclosed air circulation systems require that a very clean environment be maintained internally. For example, enclosures for sensitive manufacturing processes, such as those used in the food, pharmaceutical, and semiconductor industries, may be subject to strict air quality controls. In addition, enclosures housing sensitive instrumentation must maintain a clean air environment in order to ensure adequate performance of the instrumentation. In these enclosures, particulate contamination may originate from inside the enclosure from internal sources.

In addition, systems that induce air flow or circulation using vacuum pumps, blowers, or compressors are subject to increased wear and reduced lifetimes due to the damaging effects of particulate-contaminated air on these components. Such systems stand to benefit from an efficient air precleaner that removes particulate contaminants before they are taken into the machinery of the systems.

The precleaners of the prior art have various configurations that are employed as a means of removing the particulates from the air. Most of these precleaners are adapted to operate in open air systems, such as the air intake system on an internal combustion engine, which draw ambient air into the system. Examples of precleaners or particle separators are shown in U.S. Pat. Nos. 1,641,746; 2,193,479; 2,304,778; 2,417,130; 2,973,830; 3,552,102; 3,670,480; 3,740,932; 3,791,112; 3,973,937; 4,138,761; 4,197,102; 4,547,207; 5,022,903; 5,449,391; 5,505,756; and 6,264,712.

Although such precleaners may be suited for particulate removal in an open system, they are not designed to remove particulates contained within a vacuum system.

SUMMARY OF THE INVENTION

The present invention provides a precleaner for mechanically removing particulate contaminants from a vacuum system. In these systems, the precleaner may be inserted between a chamber under vacuum and the air pressure differential source that creates the vacuum in order to protect the air pressure differential source from particulate contaminants. Exemplary systems in which the precleaner may be used include, but are not limited to, closed vacuum systems and pneumatic conveyor systems. In these systems air flow may controlled by such devices as vacuum pumps, blowers, and air compressors.

The air precleaner in accordance with the present invention provides high efficiency removal of particulates from a vacuum system while significantly reducing the air flow restriction or pressure drop, encountered in the conventional air precleaners. The air precleaner of the invention includes a peripheral air intake manifold having at least one air intake port; a mechanical separation unit coupled to the intake manifold, the separation unit having an input port in fluid communication with the at least one intake port of the intake manifold, an output port for expelling precleaned air, and a base having at least one discharge port for discharging particulates from the mechanical separation unit; and a central exhaust pipe disposed in fluid communication with the output port of the mechanical separation unit. The intake manifold and the mechanical separation unit are housed in a container having an entrance port and an exit port. Optionally, an entrance fitting and an exit fitting may be mounted to the entrance and exit ports, respectively. The container includes a removable canister that surrounds a portion of the separation unit and receives and holds particulates discharged therefrom. The entrance port on the container is in fluid communication with the at least one intake port on the intake manifold and the exit port on the container is in fluid communication with the exhaust pipe. The exhaust pipe may be coupled to the fitting assembly, the intake manifold, the particle separator, or the canister, in such a manner that it extends into or through the opening defined by the peripheral intake manifold when the precleaner is operating. This configuration defines an air space that extends from the entrance port through the intake manifold, the mechanical separation unit, and the exhaust pipe to the exit port. Both the entrance and exit fittings are adapted to allow the precleaner to be inserted into or onto a vacuum system from which airborne particulates are to be removed. For example, the precleaner may be coupled to a tube, pipe, or duct.

In a preferred embodiment, the container housing the intake manifold and the mechanical separation unit is a two part container formed from an upper fitting assembly and a lower canister. The fitting assembly includes the entrance and exit ports of the precleaner and their respective fittings, while the canister encloses the mechanical separation unit. The particulate matter that is separated from the air is collected in the canister. The two parts are preferably easily separated such that the canister can be removed and the particulate matter periodically disposed of.

In one embodiment, the base of the mechanical separation unit may include a side wall with a peripheral top edge and a flange extending outwardly from the top edge to the inner surface of the canister to separate the canister into a top compartment and a bottom compartment which are substantially sealed off from each other. The discharge port is in communication with the bottom compartment. This configuration allows the particulates that are discharged through the discharge port in the mechanical separation unit to be collected in the bottom compartment of the canister and prevents the particulates from being drawn back into the separation unit.

As air in the vacuum system is drawn through the precleaner, the moving air passes through the intake manifold. The air then enters the mechanical separation unit where a preferably tangential component of the flow forces the particulate matter within the air against the side wall of the base, and ultimately, toward the discharge port. A rotor may be rotably mounted to the base of the mechanical separation unit. When the rotor is rotating it physically impels the particulates from the air downwardly and outwardly into the side wall of the base toward the discharge port, enhancing particulate separation. The precleaned air is released from the mechanical separation unit through the central exhaust pipe where it is discharged into the vacuum system through the exit port of the precleaner.

In one embodiment of the invention, the precleaner is inserted into or onto an enclosed vacuum system. The enclosure is formed when the precleaner is inserted into or onto a vacuum chamber or loop made from coupled containers, tubes, pipelines, ducts and the like, to form a closed system. The air is drawn from the enclosed systems using an air pressure differential source (i.e. a vacuum source) that creates a lower than ambient pressure within the system. The air may be drawn from the system using pumps, blowers, and compressors. In this configuration the precleaner is coupled to the vacuum chamber or loop such that the input port of the precleaner is in fluid communication with the chamber or loop and the output port of the precleaner is in fluid communication with a suction port on the suction side of the vacuum source. In one embodiment the air in the system may be primarily recycled or recirculated air, as opposed to air that is constantly being brought in from outside of the system. Air recirculation systems in which the precleaner of the present invention may be used are commonly employed in food processing and pharmaceutical and semiconductor manufacturing plants.

In another embodiment of the invention, the precleaner is inserted into a pneumatic conveyor system. In a pneumatic conveyor system, pressure differentials are used to regulate the airflow through the system. In this embodiment the precleaner may be coupled to the inlet of the air pressure source that creates the airflow. Examples of air pressure sources include pumps, compressors, and blowers.

Further objects, features, and advantages of the invention will be apparent from the following detailed description when taken in conjunction with the accompanying drawings.

DETAILED DESCRIPTION OF THE INVENTION

Figure 1:
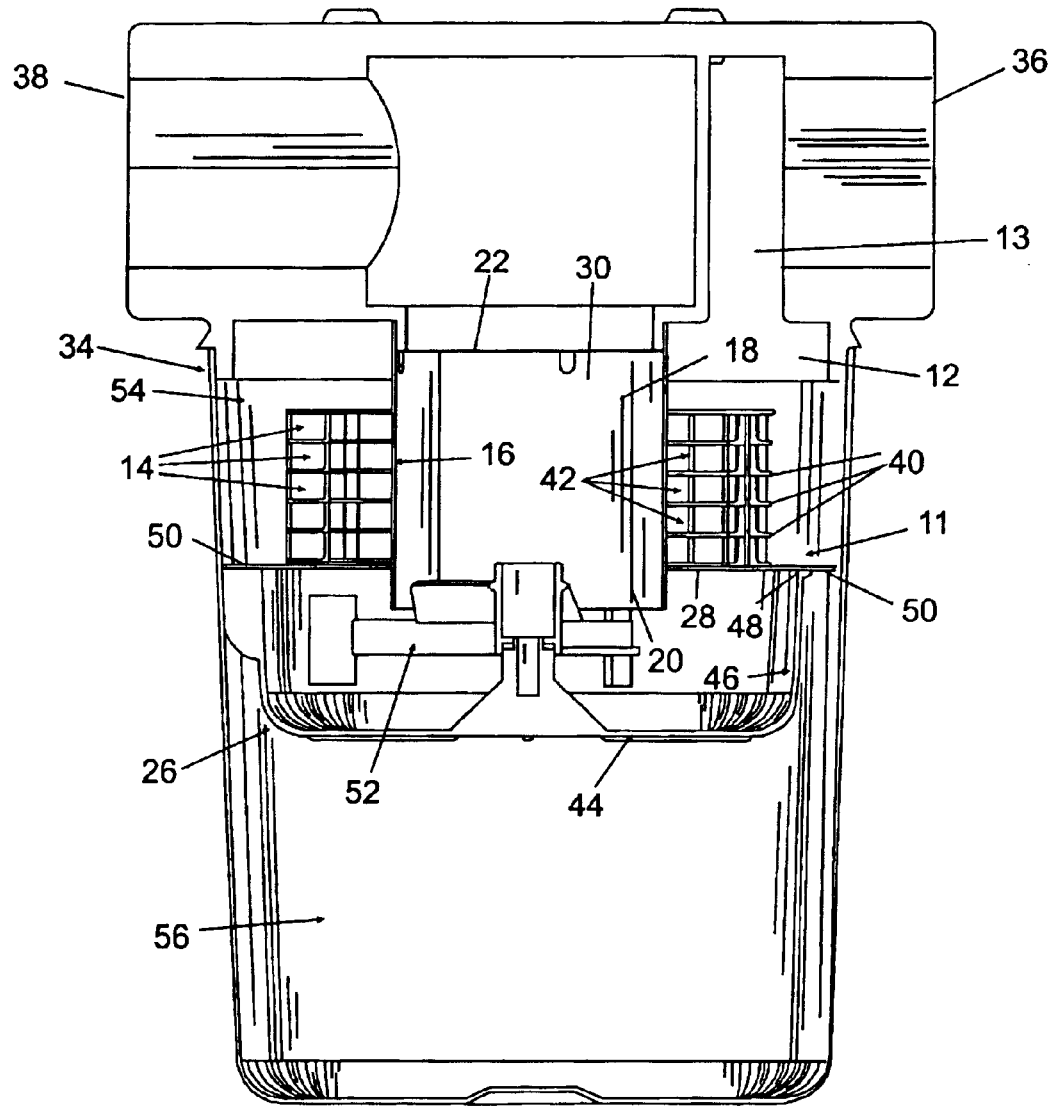
FIG. 1 is a cross-sectional view of the precleaner of the present invention.
Figure 2:
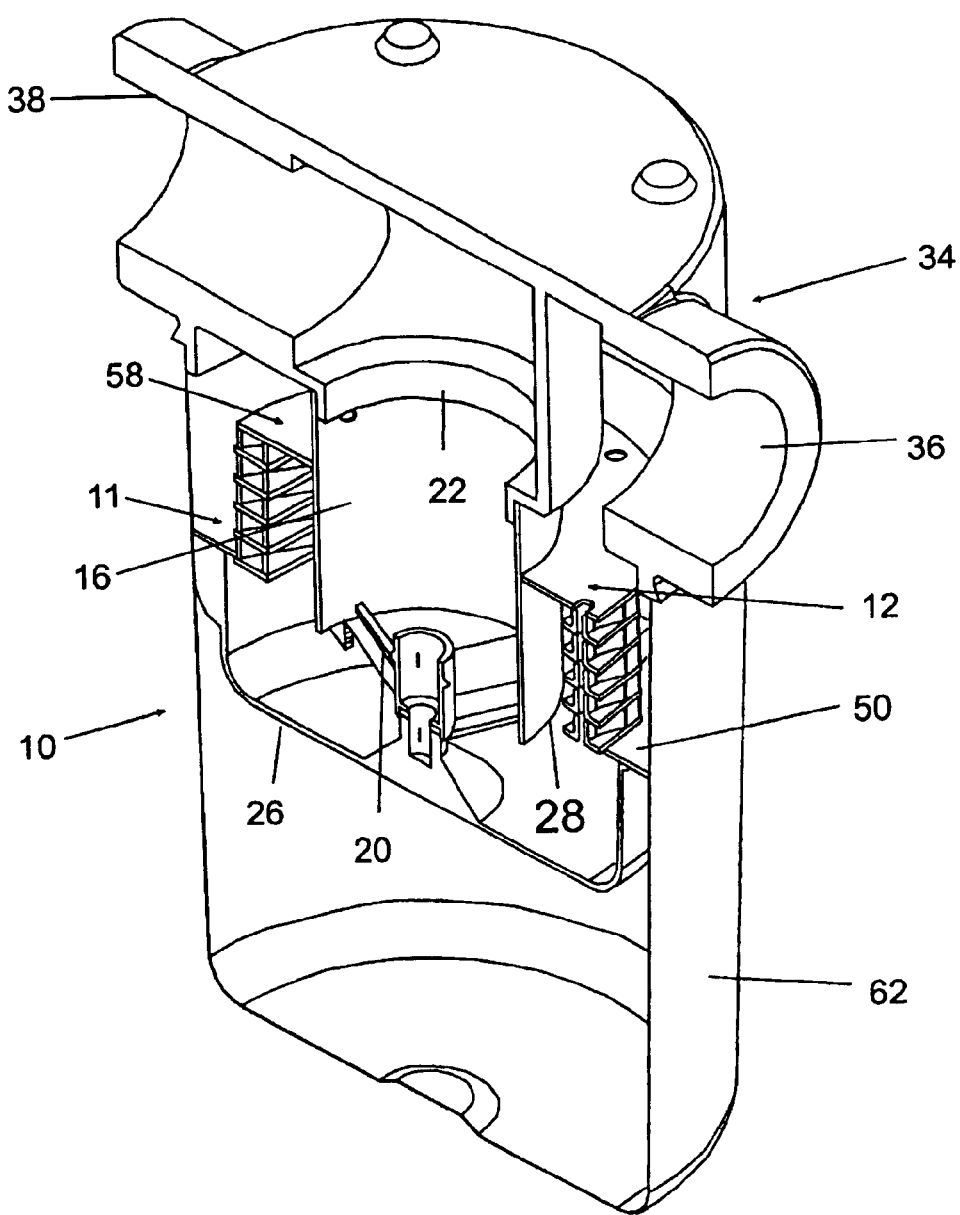
FIG. 2 is a perspective, cross-sectional view of the precleaner of the present invention.
Figure 3:
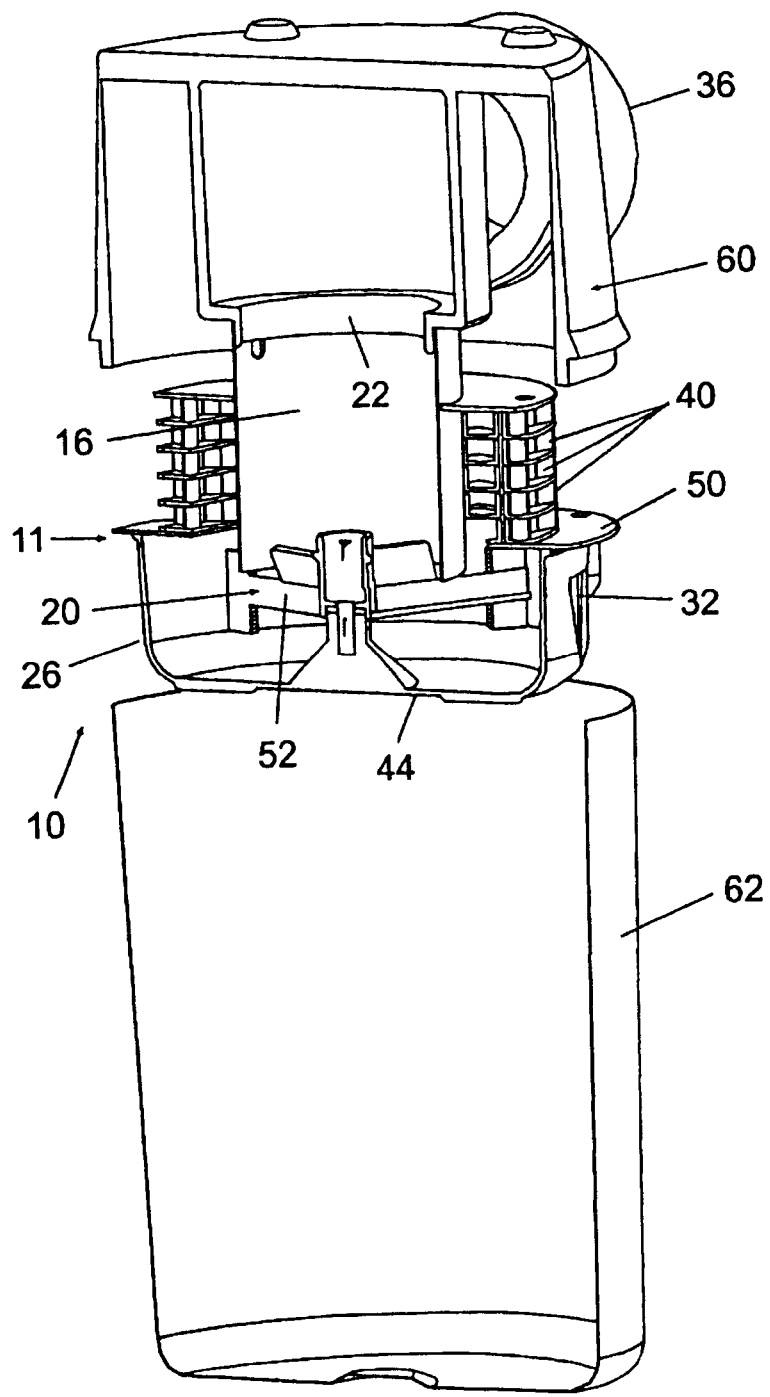
FIG. 3 is a another perspective, cross-sectional view of the precleaner of the present invention showing the separation canister from the rest of the precleaner.

With reference to the drawings, FIGS. 1–3 are views of an exemplary air precleaner of the present invention shown generally at 10. The precleaner 10 is used for separating particulates from air before it is drawn into a vacuum source. Exemplary particulates include dust, dirt, sand, sawdust or any other airborne particulate matter. The air precleaner 10 includes a mechanical separation unit 11 and a peripheral air intake manifold 12 with an air intake channel 13 therein. A plurality of intake ports 14 are formed to admit air into the separation unit. The separation unit 11 has an input port 28 in fluid communication with the intake ports 14, an output port 30 for expelling precleaned air, and a base or hood 26 having a discharge port 32 for discharging particulates from the mechanical separation unit 11. In the embodiment depicted in the figures, the input port 28 is cylindrical. The precleaner also includes an exhaust pipe 18 defining the output port of the mechanical separation unit 11.

The mechanical separation unit 11 is housed in a container 34 having an entrance port 36 in fluid communication with the intake manifold 12 and an exit port 38 in fluid communication with the exhaust pipe 18. The container 34 seals the separation unit 11 off from the ambient atmosphere, thus preventing outside air from being drawn into the separation unit. An entrance fitting and an exit fitting are mounted on the entrance port 38 and the exit port 36 of the precleaner, respectively. These fittings are adapted to be connected to matching fittings on the passages or conduits of a vacuum system, such as tubes, air ducts or pipes.

The intake manifold 12 may be formed, e.g., of plastic such as glass filled acetyl plastic. At least one intake port (or preferably a plurality of intake ports 14 as shown in the figures) are aligned tangentially with respect to the central axis of the intake manifold 12. In the preferred embodiment shown in FIGS. 1–3, the intake ports are formed of a plurality of parallel plates 40 defining a plurality of gaps between them. The topmost plate 58 is designated the top plate. In these gaps, a series of vanes 42 are mounted. The vanes 42 are preferably mounted between the plates 40 at an angle that is between radial and tangential. In the configuration shown, the openings defined by the plates 40 and the vanes 42 form the intake ports 14. A preferred construction for a mechanical separation unit 11 of this type is shown in U.S. Pat. No. 6,264,712, the disclosure of which is incorporated by reference. However, the present invention is not limited to this type of separation unit, and other mechanical precleaners may also be utilized as the separation unit although they are not preferred.

The air intake manifold of the invention may be formed so that all of the air intake to the separation unit is through the peripheral intake ports 14. As best illustrated in FIG. 2 the top of the intake ports may be closed by the top plate 58 which extends from the wall of the exhaust pipe 18 over the top of the ports, thereby enclosing the air space within the intake ports at the top. All air intake is thus through the peripheral intake ports 14. The vanes 42 direct air into the enclosed air space within the separation unit 11 with both a radially inward and a tangential component of velocity, and the tangential component of velocity of this incoming air impacts on a rotor assembly to drive a rotor 52 in rotation in the desired direction.

The base or hood 26 of the mechanical separation unit 11 preferably has a floor 44 and a cylindrical side wall 46, terminating at a peripheral top edge 48. A flange 50 extends outwardly from the top edge 48. The mechanical separation unit 11 also includes at least one discharge port 32 in the floor 44 and/or the side wall 46 of the base 26, as best shown in FIG. 3. The discharge port 32 may be an indented vertical slot in the side wall that faces outwardly in the direction opposite the direction of the motion of the particles along the floor and side wall. The flange 50 separates the container 34 into two compartments 54 and 56 which are substantially sealed off from each other so that air and particulates are blocked from flowing between the compartments 54 and 56. Particulate matter is discharged from the mechanical separation unit 11 through the discharge port 32 into the bottom compartment 56 where it is collected. In the exemplary embodiment shown in FIGS. 1–3, the mechanical separation unit 11 includes at least one rotor 52 that is rotably mounted to the floor 44 of the base 26. By way of example, the rotor may be rotably mounted with a nut engaging a bolt which supports a bearing on which the rotor assembly is mounted for rotation. The center of the floor 44 may be depressed so that the nut and the end of the bolt are enclosed within the depression. The rotor and other components may be formed as described in U.S. Pat. No. 6,264,712.

The inlet port 28 of the mechanical separation unit 11 is in fluid communication with the intake ports 14 and may be defined by the ring-shaped gap between the discharge pipe 18 and the intake ports. The exhaust pipe 18 is in fluid communication with the output port 30 of the mechanical separation unit 11. Though the exhaust pipe is designated as a "pipe," this terminology is not intended to imply a particular length or cross-sectional shape. The "pipe" may take on a variety of shapes and dimensions and may be formed or defined by a pipe, tube, ring or the like. In the embodiment exemplified in FIGS. 1–3, the exhaust pipe 18 is formed as a short cylindrical pipe having a bottom end 20 and a top end 22. The bottom end 20 of the exhaust pipe 18 defines the output port 30 of the mechanical separation unit. However, the output port and the exhaust pipe may be separate connectable entities. When the precleaner is assembled in its operating configuration the central exhaust pipe extends into or through the center opening that is defined by the peripheral intake ports 14.

As discussed above, a suitable intake manifold/mechanical separation unit for use with the present invention is shown is U.S. Pat. No. 6,264,712, which is hereby incorporated by reference. In the assembly described in the text and drawings of that patent, the "hood" corresponds to the base 26, the "inlet ports" and "air channels" correspond to the intake ports 14, and the "air outlet port" corresponds to the exhaust pipe 18.

The precleaner container 34 may have a variety of shapes and sizes, depending upon the dimensions of the intake manifold 12 and the mechanical separation unit 11. In a preferred embodiment as shown in FIGS. 1–3, the container 34 is made from two separable parts. The upper container may comprise a fitting assembly 60, which includes the entrance port 36, the intake channel 13 of the intake manifold, the exit port 38, and their corresponding fittings. The lower container is a canister 62 which surrounds the mechanical separation unit 11. The two parts of the container are preferably connected in such a way that the canister 62 may be easily disconnected from the fitting assembly 60, facilitating the disposal of any particulate matter that has been discharged from the separation unit 11 and collected in the lower compartment 56 of the canister 62. For example, the two parts of the container may snap together mechanically or the canister 62 may screw into the fitting assembly. The mechanical separation unit 11 may include a flange 50 that separates the canister 62 into two compartments, as illustrated in FIGS. 1–3, and the cross-sectional area of the internal surface of the canister 62 may be tapered from the top to the bottom (i.e. in the direction extending away from the fitting assembly 60) such that the seal between the flange 50 and the interior wall of the canister 62 tightens as the canister 62 is connected to the fitting assembly 60.

The exhaust pipe may be mounted to the fitting assembly, the intake manifold, the base, or even the canister of the precleaner.

The entrance and exit fittings on the container 34 may be any fittings which allow the precleaner 10 to be inserted into matching fittings on an air pressure differential source and a chamber under vacuum. Thus, the specific fittings chosen for a given application will depend on the nature of the matching fittings. In one relatively simple embodiment the fittings on the container may be sections of pipe or tubing over (or into) which matching sections of pipe or tubing may be extended (or inserted).

As used herein, the term "matching fitting" refers to fittings on the vacuum system that are able to interconnect with the fittings on the precleaner. Suitable fittings include standard, well-known pipe, duct, and hose fittings and connectors. The entrance port 36 and exit port 38 and their respective fittings may be disposed in a linear alignment, as shown in the FIG. 1, for easy insertion of the precleaner into a straight pipe or duct. Alternatively, the entrance and exit ports may be aligned at a variety of angles (i.e., as measured between their corresponding central axes), including, but not limited to, angles between 20° and 180°. In practice the range of angles may be limited by the dimensions of the output ports and the fittings.

The precleaner of the present invention may be used in any system in which air flows under the influence of equipment that stands to benefit from the reduction of particulate materials at the air intake. Such equipment includes, but is not limited to, vacuum pumps, including mechanical pumps, air compressors, and blowers. In these systems the precleaner may be inserted between a chamber under vacuum and the air pressure differential source that creates the vacuum. Two exemplary embodiments are described below. These are 1) a closed vacuum system and 2) a pneumatic conveyor system. It should be understood that these embodiments are meant only illustrate the nature of the invention and are not intended to limit the scope thereof.

The precleaner of the present invention may be installed at the intake of vacuum source in a vacuum system, which may be a closed system. As used herein, the term "closed system" refers to a system that is substantially closed to outside or external air. "Substantially closed" means that the system is sufficiently sealed to maintain a pressure that is lower than the external ambient pressure when a vacuum is applied to the system. In a closed system, the intake port or ports are not directly exposed to the environment outside of the loop as they are in conventional precleaners. The enclosure does not have to be absolutely airtight. An enclosure having small leaks may still be "substantially closed" provided that a vacuum is maintained within the system with the aid of a pressure differential source. The vacuum chamber that makes up part of the closed loop may include various components, including ducts, tubing, and pipes, as well as larger compartments. The vacuum system may also include other components such as valves, airlocks, and filters. In one embodiment the vacuum system is a recirculation loop in which air is continually cleaned and recirculated. In a recirculation system, the vacuum chambers for use with the present invention will themselves have at least one entrance and at least one exit port, each fitted with a fitting that matches the fittings on a precleaner. The air in the enclosed system may be circulated using an air pressure differential source such as a vacuum, blower, or compressor which may be inserted into the loop in any convenient location. Once the precleaner is inserted into or onto a vacuum system, the air containing particulate matter will travel into the precleaner through the entrance port of the precleaner, and precleaned air from the precleaner will passed into the vacuum pump through the exit port on the precleaner.

Figure 4:
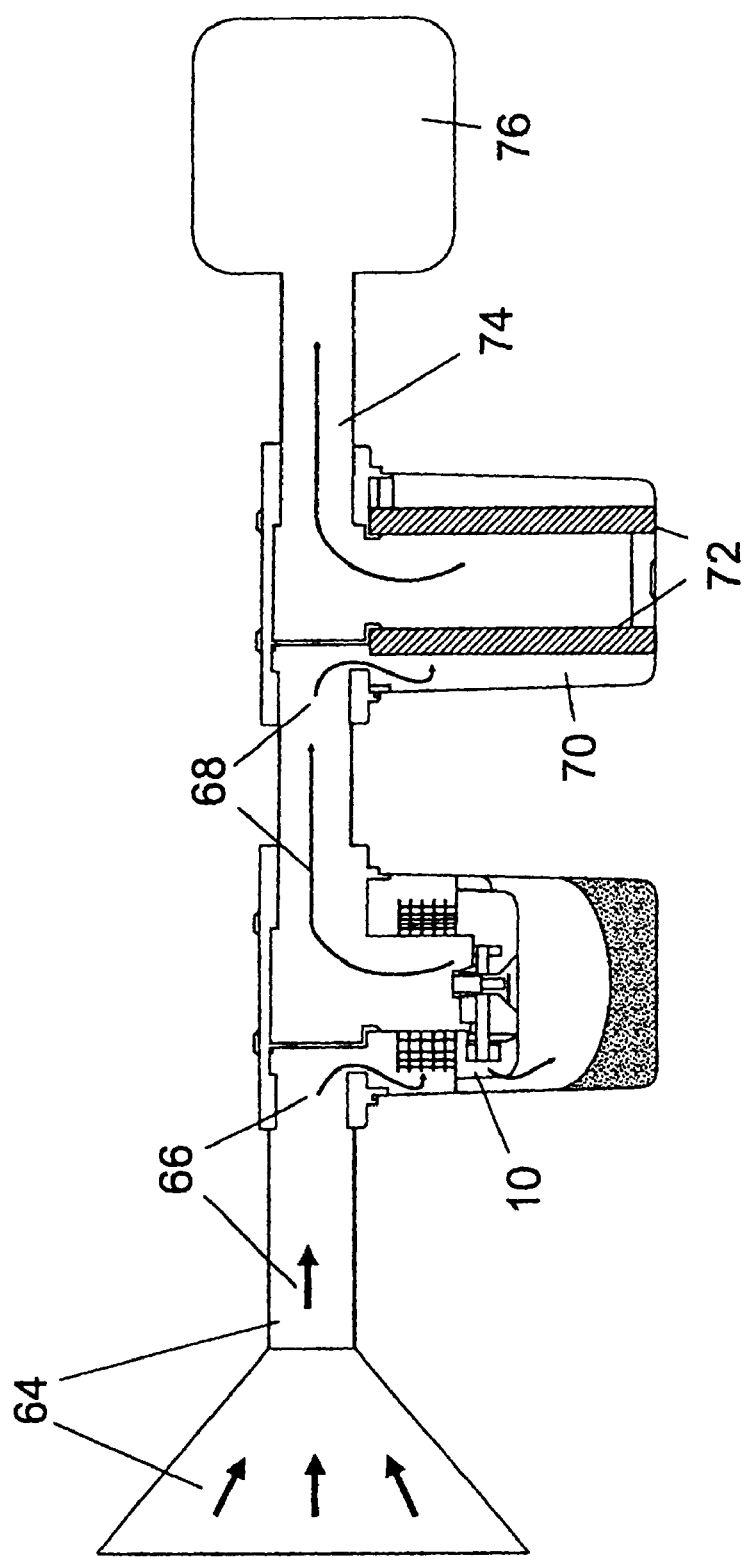
FIG. 4 is a schematic diagram of the precleaner inserted into a closed vacuum system.

FIG. 4 shows a cross-sectional view of an embodiment wherein the precleaner is inserted into a vacuum line. In this embodiment, dirty air 66 from a vacuum system is pulled through a conduit 64 into the entrance port of the precleaner 10 and precleaned air 68 is passed out through the exit port of the precleaner 10. As shown in FIG. 1, the system may include a filtration chamber 70 containing at least one filter 72. In this configuration, precleaned air 68 from the precleaner passes into the filteration chamber and filtered air 74 passes out of the filtration chamber into a vacuum pump 76.

In another embodiment of the invention, the precleaner is inserted into a pneumatic conveyor system. In a pneumatic conveyor system, pressure differentials are used to convey and regulate the airflow through the system using a pressure differential source. These systems are used to transport materials in an air stream. The materials are usually granular, powdered, pelleted, or liquid materials. The precleaner represents a significant improvement over more restrictive filters and particle separators in that it maintains a high air throughput. This minimizes the pressure drop and eliminates the need for a more powerful pressure differential source.

A typical pneumatic conveyor system includes at least one storage container for storing a material for transport, a transporting conduit in fluid communication with the storage container for channeling air in which the material for transport is suspended, an air pressure differential source in communication with the transporting conduit for creating a pressure differential between the storage container and the transporting conduit such that the material in the storage container is drawn into the conduit, and a receiving container disposed at the end of the transporting conduit for collecting the transported material. Some pneumatic conveyor systems include two or more storage chambers and a mixing chamber. In these systems, product is drawn pneumatically from each of the storage chambers into the mixing chamber where the products become mixed. Suitable air pressure sources include, but are not limited to, vacuum pumps, air compressors, and blowers. In addition, the pneumatic conveyor system may include other conveying and processing components, such as filters, screens, baffles, airlocks, and valves. For the purposes of this disclosure, a transporting conduit is any channel through which the material to be transported is conveyed in an air stream. The conduit may include multiple components, including material separators, pipelines, tubing, baffles, airlocks, and the like. Exemplary pneumatic conveying systems in which the precleaner of this invention may be used are described in U.S. Pat. Nos. 4,009,912, 4,111,492, and 5,163,786, which are incorporated herein by reference.

In a pneumatic conveyor system, the precleaner is coupled to a suction port on the suction side of the air pressure differential source to reduce the number of particulate contaminants entering and damaging that source. In a preferred embodiment, the air pressure source is a blower. In this configuration, the input port of the precleaner is disposed in fluid communication with the transport conduit of the pneumatic conveyor and the output port of the precleaner is disposed in fluid communication with the suction port of the air pressure differential source. The precleaner may be coupled to the transporting conduit at any convenient location. In a preferred embodiment the transporting conduit has an air outlet with an outlet fitting that interconnects with an entrance fitting on the precleaner and the air pressure differential source has a fitting on its suction port that interconnects with en exit fitting on the precleaner.

Figure 5:
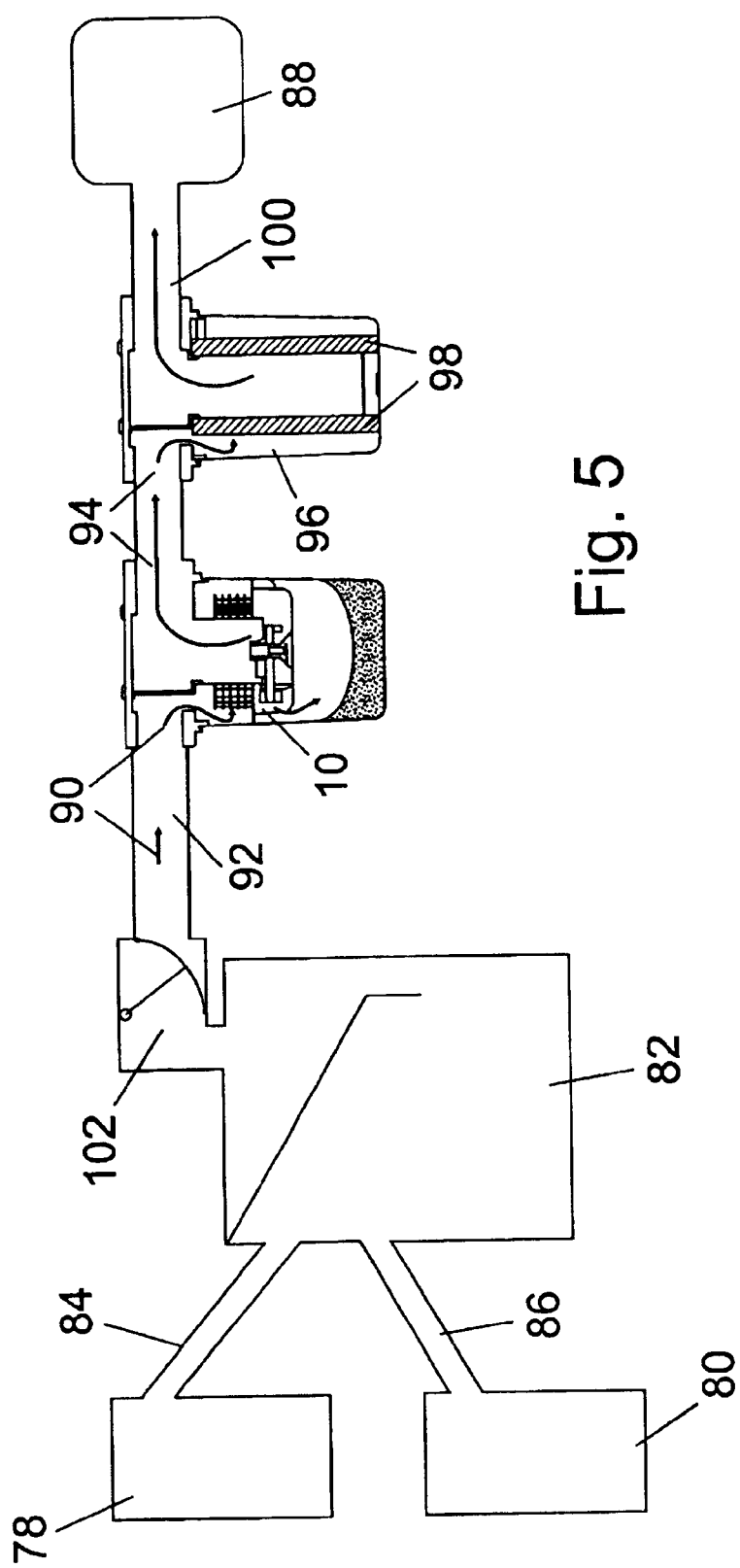
FIG. 5 is a schematic diagram of the precleaner mounted on a pneumatic conveyor system.

FIG. 5 shows a cross-sectional view of an embodiment wherein the precleaner is inserted into a pneumatic mixing system. The system depicted in FIG. 5 includes two storage containers 78 and 80 connected to a mixing chamber 82 through a pair of transporting conduits 84 and 86. A vacuum pump 88 is used to create a pressure differential which pulls product from the storage containers 78 and 80 into the mixing chamber 82. In this process, dirty air 90 is pulled through an air conduit 92 into the entrance port of the precleaner 10 and precleaned air 94 is passed out of the precleaner through the exit port of the precleaner 10. In the system of FIG. 5, a filter chamber 96 containing a filter 98 is included, such that the precleaned air 94 passes into the filter chamber 96 and filtered air 100 passes into the vacuum pump 88. As shown in the figure, the system may optionally include a vacuum release valve 102 for controlling the flow of air through the system.

The above described precleaner of the present invention is an effective means of precleaning air flowing in a vacuum system. It is to be understood that the precleaner 10 of the present invention is not limited merely to applications with air and to those applications that remove particles that are typically contained within air. The precleaner 10 will work in applications involving other fluids as well.

Though the figures and the corresponding text have been assigned a "top" and a "bottom" or an "upper" and a "lower" these terms have been used for illustrative purposes and should not be interpreted to limit the precleaner of the present invention to embodiments where it is mounted in a strictly vertical position. The precleaner may function properly at various angles with respect to the chamber to which it is attached. However, because the particulate matter will collect by gravity in the "bottom" of the canister portion of the container it is preferable that the precleaner be oriented such that the "bottom" of the container is directed substantially downward so that particulates do not fall back into the mechanical separation unit.

It is further understood that the invention is not confined to the particular construction and arrangement of parts herein illustrated and described, but embraces such modified forms thereof as come within the scope of the following claims.

What is claimed is:

1. An air precleaner that separates particulates from air, comprising:
   (a) a peripheral air intake manifold having at least one intake port through which air enters the precleaner;
   (b) a mechanical separation unit coupled to the intake manifold that separates particulates from air, the mechanical separation unit comprising an input port in communication with the at least one intake port of the intake manifold, an output port for expelling air, and a base having at least one discharge port for discharging particulates; and
   (c) a container housing the intake manifold and the mechanical separation unit and sealing the separation unit from ambient atmosphere outside the container, the container having an entrance port in communication with the at least one intake port of the intake manifold and an exit port in communication with the output port.

2. The precleaner of claim 1 wherein the container comprises:
   (a) a fitting assembly comprising the entrance port and exit port; and
   (b) a canister connectable to the fitting assembly, the canister surrounding the mechanical separation unit.

3. The precleaner of claim 2 wherein the fitting assembly and the canister mechanically snap together.

4. The precleaner of claim 2 wherein the canister screws into the fitting assembly.

5. The precleaner of claim 2 wherein the base comprises a side wall having a peripheral top edge and a flange extending outwardly from the top edge of the side wall to the inner surface of the canister such that the canister is divided by the flange into a top compartment and a bottom compartment.

6. The precleaner of claim 5 wherein the inner surface of the canister is tapered such that the flange tightens against the inner surface of the container when the canister is connected to the fitting assembly.

7. The precleaner of claim 1 wherein the separation unit output port includes a central exhaust pipe having a top end and a bottom end.

8. The precleaner of claim 1 wherein the entrance and exit ports are disposed in a linear alignment.

9. The precleaner of claim 7 wherein the intake manifold of the separation unit includes a top plate and a bottom plate in a parallel arrangement spaced to define at least one gap and a series of vanes mounted in the at least one gap at an angle between radial and tangential to define channels between them, the channels serving as intake ports.

10. The precleaner of claim 9 wherein the top plate extends outwardly from a central exhaust pipe to the vanes such that air may enter the intake manifold only through the intake ports defined by the plates and the vanes.

11. The precleaner of claim 1 wherein the intake manifold comprises a plurality of plates in a parallel arrangement spaced to define a plurality of gaps and a series of vanes mounted in the gaps at an angle between radial and tangential to define channels between them, the channels serving as intake ports.

12. The precleaner of claim 1 wherein the mechanical separation unit further includes a rotor rotably mounted to the base.

13. The precleaner of claim 1 wherein the base has a cylindrically shaped side wall and the discharge port is formed as a slot in the side wall.

14. A pneumatic conveyor system comprising:
   (a) a storage container for storing a material to be transported;
   (b) a transporting conduit in communication with the storage container for transporting the material in an airstream;
   (c) an air precleaner for separating particulates from, comprising:
      (i) a peripheral air intake manifold having at least one intake port through which air enters the precleaner, the at least one intake port in fluid communication with the transporting conduit;
      (ii) a mechanical separation unit coupled to the intake manifold that separates particulates from air, the mechanical separation unit comprising an input port in communication with the at least one intake port of the intake manifold, an output port for expelling air, and a base having at least one discharge port for discharging particulates; and
      (iii) a container housing the intake manifold and the mechanical separation unit and sealing the separation unit from ambient atmosphere outside the container, the container having an entrance port in communication with the at least one intake port of the intake manifold and an exit port in communication with the output port; and
   (d) an air pressure differential source in communication with the output port of the precleaner for creating the airstream in the transporting conduit.

* * * * *